(12) United States Patent
Feng et al.

(10) Patent No.: US 10,078,531 B2
(45) Date of Patent: *Sep. 18, 2018

(54) PREDICTIVELY PROVISIONING CLOUD COMPUTING RESOURCES FOR VIRTUAL MACHINES

(71) Applicant: INTERNATIONAL BUSINESS MACHINES CORPORATION, Armonk, NY (US)

(72) Inventors: Zhong Qi Feng, Beijing (CN); Jiang Tao Li, Beijing (CN); Yi Bin Wang, Beijing (CN); Chao Yu, Ningbo (CN); Qing Feng Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/692,618

(22) Filed: Aug. 31, 2017

(65) Prior Publication Data
US 2017/0364383 A1    Dec. 21, 2017

Related U.S. Application Data

(63) Continuation of application No. 14/852,043, filed on Sep. 11, 2015, now Pat. No. 9,817,690.

(51) Int. Cl.
*G06F 9/455* (2018.01)
*G06F 9/46* (2006.01)
(Continued)

(52) U.S. Cl.
CPC ......... *G06F 9/45558* (2013.01); *G06F 9/455* (2013.01); *G06F 9/45533* (2013.01);
(Continued)

(58) Field of Classification Search
None
See application file for complete search history.

(56) References Cited

U.S. PATENT DOCUMENTS 8,434,088 B2    4/2013  Banerjee
8,826,277 B2    9/2014  Chang et al.
(Continued)

OTHER PUBLICATIONS

Sadeka Islam, Jacky Keung, Kevin Lee, Anna Liu, Empirical Prediction Models for Adaptive Resource Provisioning in the Cloud, vol. 28, Issue 1, Jan. 2012, pp. 155-162.
(Continued)

*Primary Examiner* — Charles M Swift
(74) *Attorney, Agent, or Firm* — Isaac J. Gooshaw, Esq.; George S. Blasiak, Esq.; Heslin Rothenberg Farley & Mesiti, P.C.

(57) ABSTRACT

Methods, computer program products, and systems are presented. The methods include, for instance: predictively provisioning, by one or more processor, cloud computing resources of a cloud computing environment for at least one virtual machine; and initializing, by the one or more processor, the at least one virtual machine with the provisioned cloud computing resources of the cloud computing environment. In one embodiment, the predictively provisioning may include: receiving historical utilization information of multiple virtual machines of the cloud computing environment, the multiple virtual machines having similar characteristics to the at least one virtual machine; and determining the cloud computing resources for the at least one virtual machine using the historical utilization information of the multiple virtual machines. In another embodiment, the predictively may include updating a provisioning database with the historical utilization information of the multiple virtual machines of the cloud computing environment.

20 Claims, 9 Drawing Sheets

(51) Int. Cl.

| | | |
|---|---|---|
| *G06F 15/173* | (2006.01) | |
| *G06F 9/50* | (2006.01) | |
| *H04L 29/08* | (2006.01) | |
| *G06F 11/30* | (2006.01) | |
| *H04L 29/06* | (2006.01) | |
| *G06F 9/48* | (2006.01) | |

(52) U.S. Cl.
CPC .............. *G06F 9/48* (2013.01); *G06F 9/4881* (2013.01); *G06F 9/4887* (2013.01); *G06F 9/50* (2013.01); *G06F 9/5005* (2013.01); *G06F 9/505* (2013.01); *G06F 9/5011* (2013.01); *G06F 9/5016* (2013.01); *G06F 9/5027* (2013.01); *G06F 9/5038* (2013.01); *G06F 9/5044* (2013.01); *G06F 9/5055* (2013.01); *G06F 9/5061* (2013.01); *G06F 9/5072* (2013.01); *G06F 9/5077* (2013.01); *G06F 9/5083* (2013.01); *G06F 9/5088* (2013.01); *G06F 11/30* (2013.01); *H04L 67/1097* (2013.01); *H04L 67/22* (2013.01); *H04L 67/38* (2013.01); *G06F 2009/4557* (2013.01); *G06F 2009/45562* (2013.01); *G06F 2009/45575* (2013.01); *G06F 2009/45591* (2013.01); *G06F 2009/45595* (2013.01)

(56) References Cited

U.S. PATENT DOCUMENTS

| 9,288,148 | B1 | 3/2016 | Krishnaswamy |
|---|---|---|---|
| 2010/0199285 | A1 | 8/2010 | Medovich |
| 2011/0202925 | A1 | 8/2011 | Banerjee |
| 2012/0131161 | A1 | 5/2012 | Ferris |
| 2012/0317249 | A1 | 12/2012 | Salsburg |
| 2013/0055239 | A1 | 2/2013 | Anderson et al. |
| 2013/0097601 | A1 | 4/2013 | Podvratnik et al. |
| 2013/0297964 | A1 | 11/2013 | Hegdal et al. |
| 2014/0059542 | A1 | 2/2014 | Ashok |
| 2014/0089917 | A1 | 3/2014 | Atalla |
| 2014/0282520 | A1 | 9/2014 | Sabharwal |
| 2014/0282541 | A1 | 9/2014 | Perlegos |
| 2014/0317618 | A1 | 10/2014 | Behera |
| 2015/0067677 | A1 | 3/2015 | Naseh et al. |
| 2015/0249615 | A1 | 9/2015 | Chen |
| 2017/0075709 | A1 | 3/2017 | Feng et al. |

OTHER PUBLICATIONS

Calcavecchia, N.M.; Biran, O.; Hadad, E.; Moatti, Y., VM Placement Strategies for Cloud Scenarios, Date of Conference: Jun. 24-29, 2012 pp. 852-859.

Non-Final Office action, U.S. Appl. No. 14/852,043, dated Aug. 25, 2016.

Feng, et al. Response to Non-Final Office action, U.S. Appl. No. 14/852,043, dated Nov. 23, 2017.

Non-Final Office action, U.S. Appl. No. 14/852,043, dated Jan. 13, 2017.

Feng, et al. Response to Non-Final Office action, U.S. Appl. No. 14/852,043, dated May 15, 2017.

Notice of Allowance, U.S. Appl. No. 14/852,043, dated Jul. 10, 2017.

List of IBM Patent and/or Patent Applications, treated as related for U.S. Appl. No. 15/692,618, dated Aug. 31, 2017. (2 pages).

PREDICTIVELY PROVISIONING CLOUD COMPUTING RESOURCES FOR VIRTUAL MACHINES

CROSS-REFERENCE TO RELATED APPLICATION

This application is a continuation of U.S. Ser. No. 14/852,043, filed Sep. 11, 2015, and titled "Predictively Provisioning Cloud Computing Resources for Virtual Machines," the entirety of which is hereby incorporated herein by reference.

TECHNICAL FIELD

The present disclosure relates to virtualization technologies, including virtual networking and virtual computing, and more particularly to methods, computer program products, and systems for predictively provisioning cloud computing resources of a cloud computing environment for virtual machines.

BACKGROUND

To meet the continuing demand for high-capacity distributed data centers and the increasing need for scalable computing resources, the computer industry has pursued technologies to enable large scale deployments of cloud computing environments. Cloud computing environments, which make use of virtualization technologies, such as virtual networking and virtual machine architectures, provide enhanced flexibility in the deployment of services and hardware infrastructures, by allowing for the abstraction of physical resources into logical representations. However, some of these attractive aspects of cloud computing environments can pose management challenges, for example, in the areas of provisioning, monitoring, and deploying such resources, because the very abstractions that provide flexibility can impede manageability.

By way of example, a large-scale cloud computing environment may include numerous geographically dispersed computing nodes hosting numerous computing resources for numerous different tenants. For instance, computing equipment and systems from multiple vendors can be installed, and management, provisioning, and deployment of cloud computing resources may be performed on an ad hoc basis, without centralized management and/or control. Such conditions can lead to poor allocation of resources, in which some computing nodes are running at full capacity, and others are idling.

For example, current systems for choosing provisioning locations of virtual machines in a cloud computing environment only focus on static system information available at the time a virtual machine is provisioned, and do not take into account varying run-time resource utilization of virtual machines when allocating cloud computing resources. However, because each virtual machine may run for a long period of time, and during such time, may allocate and re-allocate cloud computing resources, initial static allocations can lead to wide departures from optimized load balancing of resources in a complex, distributed cloud computing environment.

In addition, multiple hypervisors, or virtual machine monitors, may each control the deployment of virtual machines across different computing nodes, based in part on software compatibility of the hypervisors and the computing nodes. In such a case, achieving a scalable, load-balanced deployment of numerous virtual machines is hampered because of the lack of multi-vendor interoperability and ability to allocate resources on a unified basis regardless of which hypervisor controls such resources.

Further, geographic dispersal of computing resources, varying levels of network bandwidth, disparate levels of processing resources, and the presence of multiple tenants on a given system, can lead to an extremely complex deployment model that is far beyond the ability of present tools and techniques to optimize and/or manage. Therefore, a need exists for methods, computer program products, and systems to intelligently provision cloud computing resources for virtual machines.

SUMMARY

The shortcomings of the prior art are overcome, and additional advantages are provided, through the provision, in one aspect, of a method. The method includes, for example: predictively provisioning, by one or more processor, cloud computing resources of a cloud computing environment for at least one virtual machine; and triggering, by the one or more processor, initializing the at least one virtual machine with the provisioned cloud computing resources of the cloud computing environment. For example, the method may optimize the use of cloud computing resources.

In one embodiment, the predictively provisioning includes: receiving historical utilization information of multiple virtual machines of the cloud computing environment, the multiple virtual machines having similar characteristics to the at least one virtual machine; and determining the cloud computing resources for the at least one virtual machine using the historical utilization information of the multiple virtual machines. For example, historical utilization information may be used to predict the expected runtime resource utilization of a virtual machine with similar characteristics, minimizing the need to migrate or re-provision the virtual machine as resource utilization changes.

In one embodiment, the predictively provisioning further includes updating a provisioning database with the historical utilization information of the multiple virtual machines of the cloud computing environment. For example, a provisioning database may be used to store long-term historical utilization information of virtual machines to allow provisioning to be continuously improved during operation of a cloud computing environment.

In one embodiment, the determining further includes data mining the provisioning database to determine the cloud computing resources, the data mining including using at least one of regression or constraint analysis of the provisioning database. For example, data mining techniques, including regression or constraint analysis, may allow long term trends of virtual machine performance attributes to be used in determining which cloud computing resources to provision for a virtual machine.

In one embodiment, the predictively provisioning includes: receiving a provisioning request, the provisioning request including at least processor, memory, storage, or tenant requirements of the at least one virtual machine; and comparing the processor, memory, storage, or tenant requirements of the at least one virtual machine with available resources of the cloud computing environment to provision the cloud computing resources for the at least one virtual machine. For example, a provisioning request may include target resource level requirements of a virtual machine to facilitate identification of cloud computing resources for the virtual machine.

In one embodiment, the cloud computing environment includes multiple hypervisors, the predictively provisioning includes selecting the cloud computing resources associated with a hypervisor of the multiple hypervisors, and the triggering initializing includes sending an initialization request to the selected hypervisor. For example, a provisioning method that allows for operation with multiple hypervisors may allow for a mixed-vendor cloud computing environment to be deployed and provide compatibility between the different hypervisors.

In one embodiment, the predictively provisioning includes: calculating available cloud computing resources of the cloud computing environment; filtering the available cloud computing resources to determine the cloud computing resources for the at least one virtual machine, the filtering including using at least one of real-time data, empirical data, or prediction data of the cloud computing environment. For example, real-time data can allow for more accurate provisioning based on current actual conditions of a cloud computing environment, and empirical and/or prediction data can make use of computational or other models of virtual machine behavior during early stages of operation of a cloud computing environment (e.g., before collecting historical data).

In one embodiment, the triggering initializing includes hosting the at least one virtual machine using the provisioned cloud computing resources of the cloud computing environment. For example, immediately after provisioning, resources may be allocated from a target cloud computing host to host the virtual machine using the appropriate cloud computing resources.

In another aspect, a computer program product is provided. The computer program product includes a computer readable storage medium readable by one or more processor and storing instructions for execution by the one or more processor for performing a method. The method includes, for example: predictively provisioning, by one or more processor, cloud computing resources of a cloud computing environment for at least one virtual machine; and triggering, by the one or more processor, initializing the at least one virtual machine with the provisioned cloud computing resources of the cloud computing environment. For example, the method may optimize the use of cloud computing resources.

In a further aspect, a system is provided. The system includes, for instance a memory. In addition, the system includes one or more processor in communication with the memory. Further, the system includes program instructions executable by the one or more processor via the memory to perform a method. The method includes, for example: predictively provisioning, by one or more processor, cloud computing resources of a cloud computing environment for at least one virtual machine; and triggering, by the one or more processor, initializing the at least one virtual machine with the provisioned cloud computing resources of the cloud computing environment. For example, the method may optimize the use of cloud computing resources.

Additional features and advantages are realized through the techniques set forth herein. Other embodiments and aspects are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
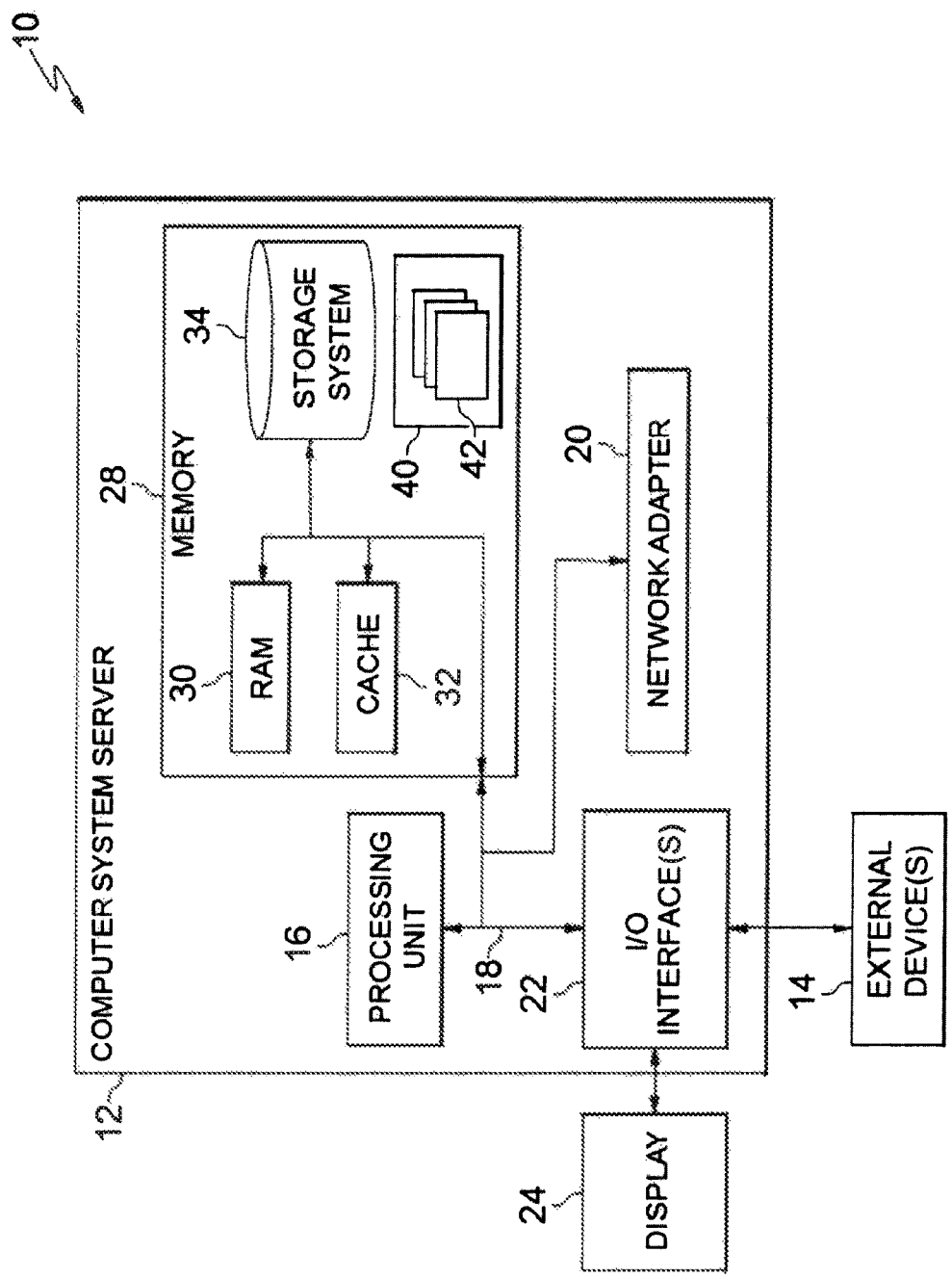
FIG. 1 depicts a cloud computing node according to an embodiment of the present invention.

Aspects of the present disclosure and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the disclosure in detail. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure.

The present disclosure provides, in part, methods, computer program products, systems, network devices, and virtual machine management software for predictively provisioning cloud computing resources for virtual machines.

Virtualization technologies continue to be deployed to meet consumer demand for high-capacity, flexible data center services, including multi-tenant solutions that allow computing resources of numerous tenants, or customers, to be hosted within a cloud environment. In such a case, the flexible virtualized technologies pose management challenges, for example, in the deployment and provisioning processes for virtual machines.

For instance, during operation of a cloud computing infrastructure, virtual machines will be launched on a routine basis. Because a cloud computing infrastructure may span numerous data centers spread across different geographical regions, it is important to provision and launch virtual machines in such a way that network bandwidth is optimized.

In addition, some virtual machines, such as those running transaction processing web servers, may have different growth and performance requirements from other virtual machines, such as those running computer aided design programs. Because of these different characteristics, it can be advantageous to allocate resources in a manner that takes into account various characteristics that are unique to different types of virtual machines before provisioning resources for such machines. Further, multi-vendor infrastructures may also lead to problems in resource allocation, because a single virtual machine monitor or hypervisor may not be able to manage all resources, and resources may be subdivided by vendor, partially defeating some of the goals of virtualization.

Advantageously, the techniques disclosed herein allow for optimized provisioning of cloud computing resources so that resources may be efficiently used, avoiding, for example, situations in which some cloud computing resources are idling and other cloud computing resources are over-subscribed.

Reference is made below to the drawings, which are not drawn to scale for ease of understanding, wherein the same reference numbers used throughout different figures designate the same or similar components.

FIGS. 1-4 depict various aspects of computing, including cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
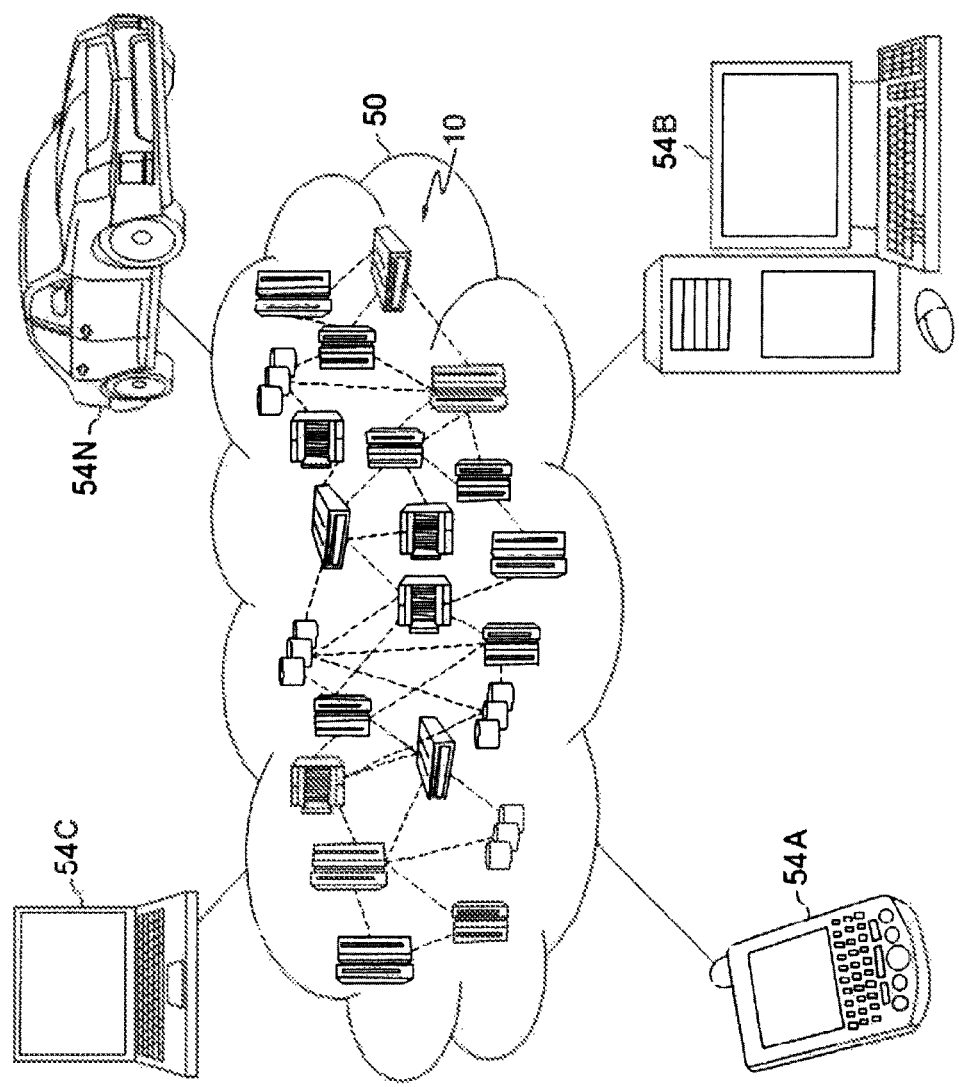
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
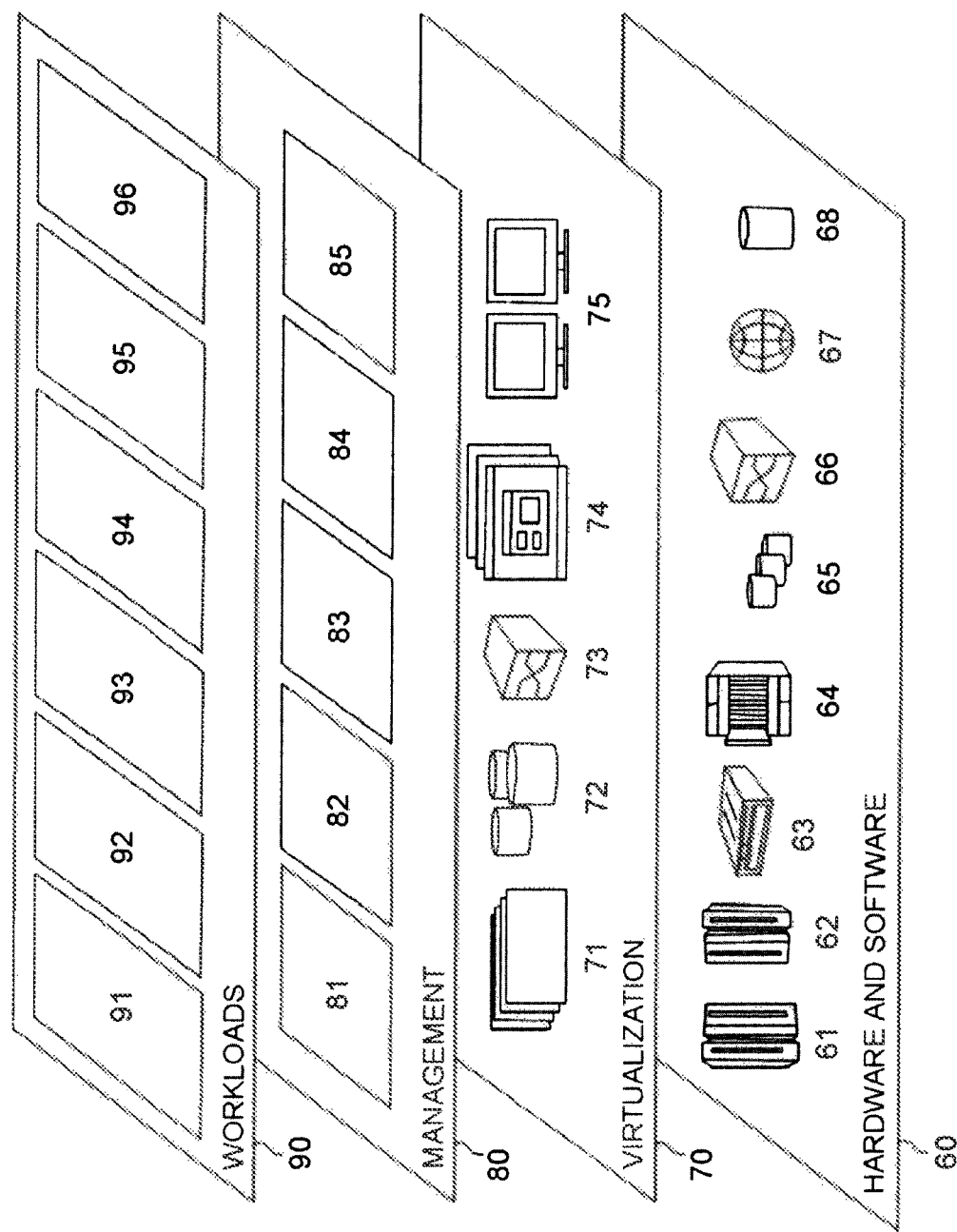
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and predictively provisioning cloud computing resources for virtual machines 96 as described herein.

Figure 4:
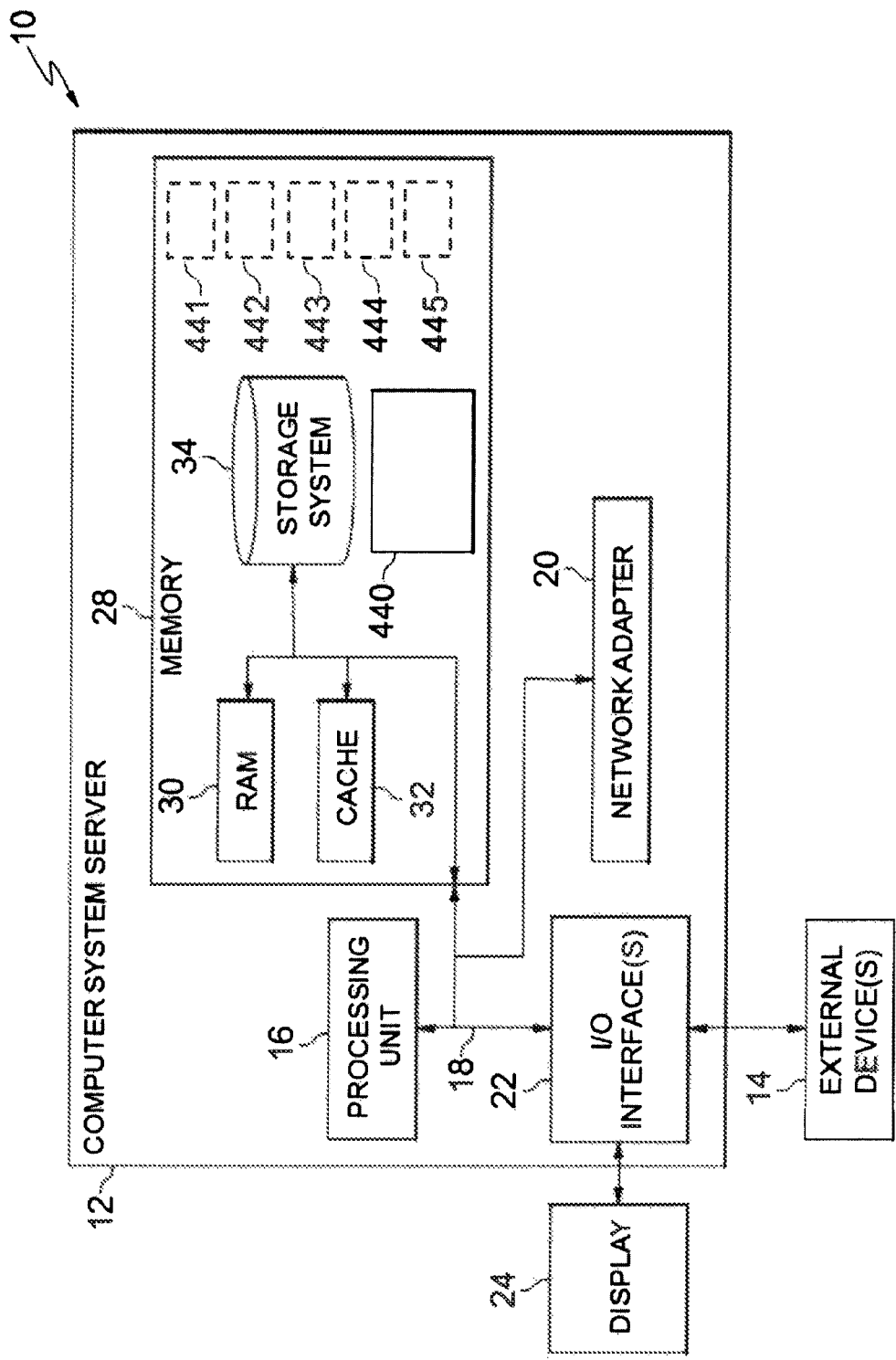
FIG. 4 depicts a hardware overview of a computing node, in accordance with one or more aspects set forth herein.

FIG. 4 depicts a hardware overview of a computing node 10, which may be a cloud computing node, in accordance with one or more aspects set forth herein. By way of example, computing node 10 may generally be any of the computing devices described herein, such as network devices, client computers, server computers, etc.

Program/utility 40 as set forth in FIG. 1 can provide the functionality of predictively provisioning cloud computing resources for virtual machines 96 as set forth in FIG. 3. Program/utility 40 as set forth in FIG. 1 can include one or more program 440 as set forth in FIG. 4, and program/utility 40 as set forth in FIG. 1 can optionally include some or all of one or more program 441, 442, 443, 444, 445.

One or more program 440 can have a set (at least one) of program modules, and may be stored in memory 28 by way of example, and not limitation, as well as an operating system, one or more application programs, other program modules, and program data. Each of the operating system, one or more application programs, other program modules, program data, and one or more program, or some combination thereof, may include an implementation of a networking environment. One or more program 440 (and optionally at least one of one or more program 441, 442, 443, 444, 445) generally carry out the functions and/or methodologies of embodiments of the invention as described herein, such as predictively provisioning cloud computing resources for virtual machines 96 (FIG. 3).

Referring again to FIG. 4:

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
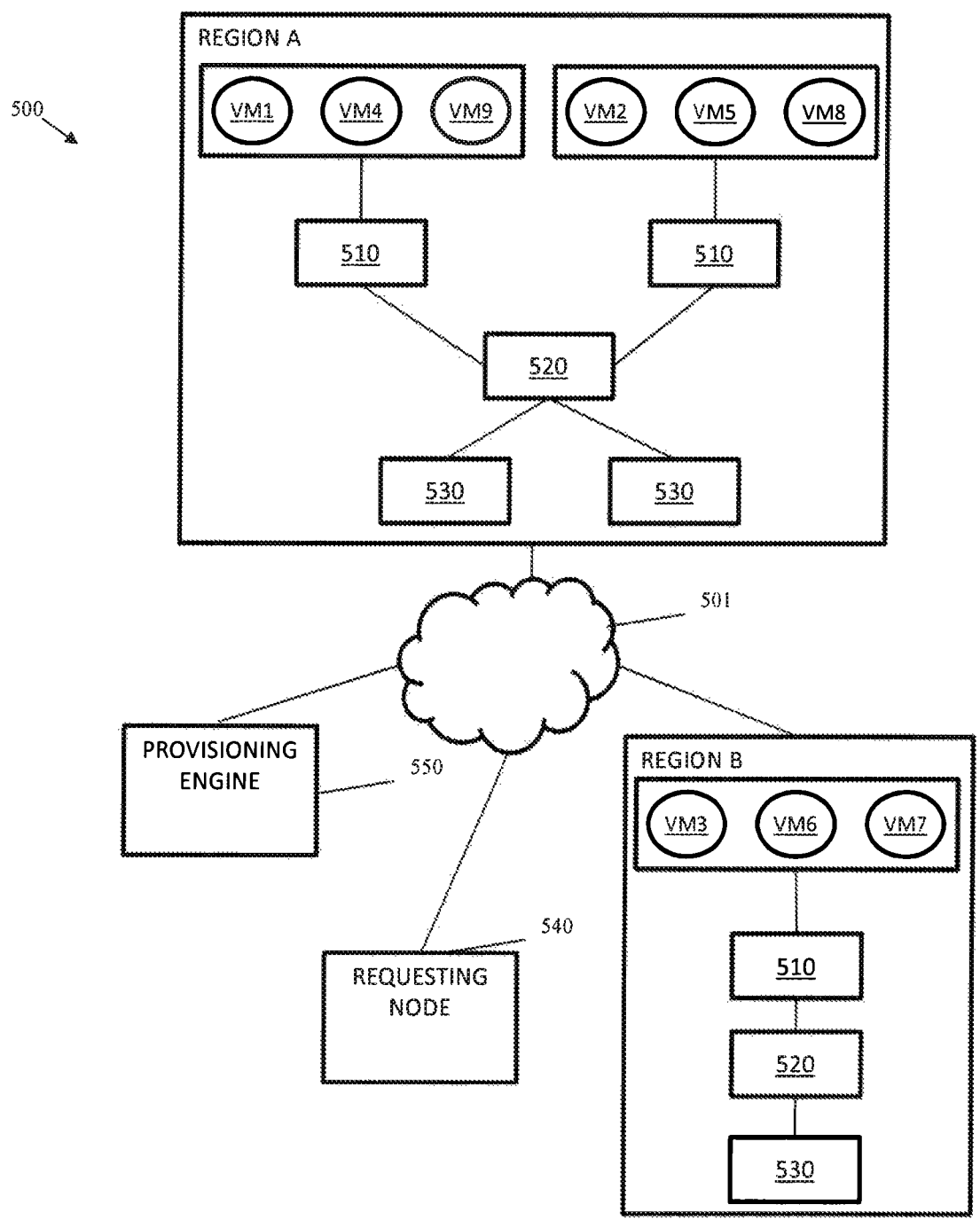
FIG. 5 is an exemplary block diagram of a system, in accordance with one or more aspects set forth herein.

FIG. 5 is an exemplary block diagram of a system 500, in accordance with one or more aspects set forth herein. In the embodiment of FIG. 5, system 500 includes numerous devices, which may be or include computing nodes 10 as previously described, connected by a network 501. For example, network 501 may be a physical network or a virtual network. A physical network can be, for example, a physical telecommunications network connecting numerous computer nodes or systems, such as computer servers and computer clients. By contrast a virtual network can, for example, combine numerous physical networks or parts thereof into a logical virtual network. In another example, numerous virtual networks can be defined over a single physical network.

By way of explanation, FIG. 5 depicts an example environment in which one or more requesting nodes 540 make a request for provisioning cloud computing resources, for example, so that a virtual machine may be initialized using those resources. In one example, a provisioning engine 550 performs techniques described herein to allocate resources. In such a case, provisioning engine 550 may trigger initialization of a virtual machine, e.g., by sending a message to a hosting computing node, which in turn will lead to the hosting computing node initializing the virtual machine. Such resources may be located in different regions, such as region A or region B. Different reasons may represent different geographic locations or different data centers or devices in a given geographical region.

In one embodiment, the different regions may include one or more computing nodes 510, which may have the characteristics of computing nodes 10 described in FIG. 4. For example, each computing node 510 may be capable of hosting or running numerous virtual machines. In addition, computing nodes 510 may be connected via storage area network switches 520 to storage nodes 530.

Figure 6:
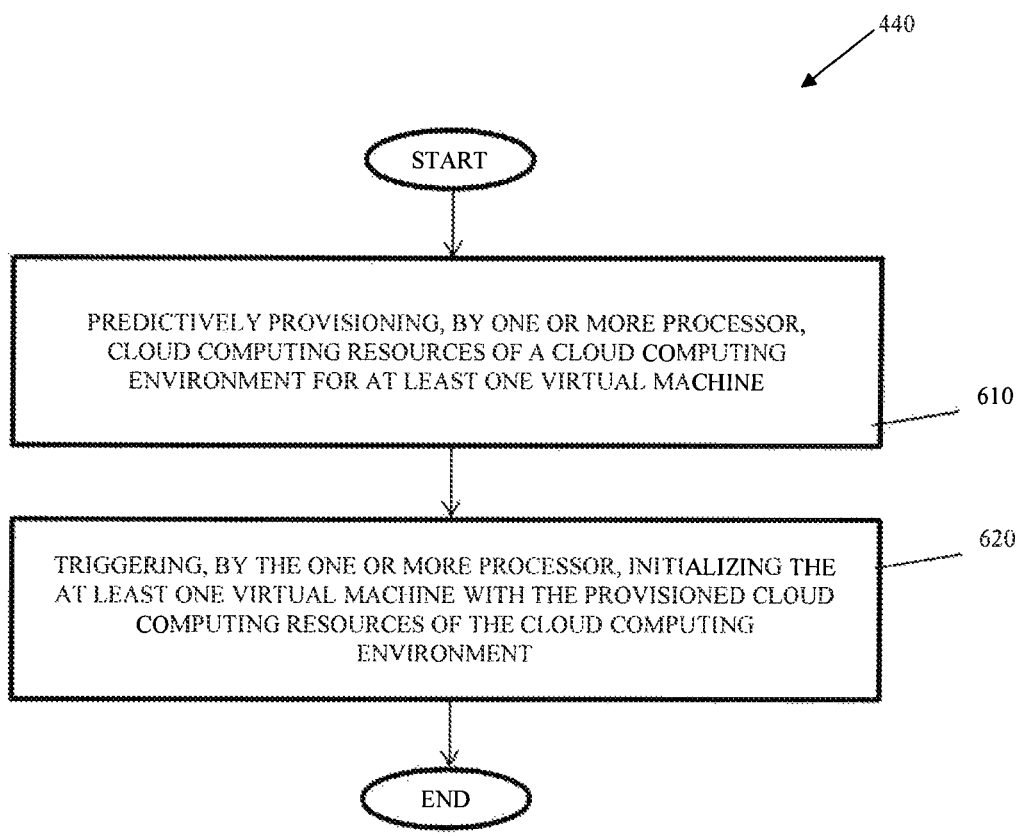
FIG. 6 depicts one or more embodiments of a process for predictively provisioning cloud computing resources for a virtual machine, in accordance with one or more aspects set forth herein.

FIG. 6 depicts embodiments of a process for predictively provisioning cloud computing resources for virtual machines, in accordance with one or more aspects set forth herein. By way of example, the processes described with respect to FIG. 6 can be performed using one or more program 440 on one or more device 550 (FIG. 5), as detailed with respect to FIG. 4.

In the embodiment of FIG. 6, one or more program 440 at block 610 predictively provisions cloud computing resources of a cloud computing environment for at least one virtual machine; and one or more program 440 at block 620 triggers initialization of the at least one virtual machine with the provisioned cloud computing resources of the cloud computing environment. For example, one or more program 440 at block 620 triggers initialization by transmitting a message to a provisioned cloud computing resource, such as a hosting computing node, requesting that the provisioned cloud computing resource perform initialization of the virtual machine.

In one embodiment, one or more program 440 at block 610 receives historical utilization information of multiple virtual machines of the cloud computing environment, the multiple virtual machines having similar characteristics to the at least one virtual machine; and one or more program 440 at block 610 determines the cloud computing resources for the at least one virtual machine using the historical utilization information of the multiple virtual machines.

In one embodiment, one or more program 440 at block 610 updates a provisioning database with the historical utilization information of the multiple virtual machines of the cloud computing environment.

In one embodiment, one or more program 440 at block 610 data mines the provisioning database to determine the cloud computing resources, the data mining including using at least one of regression or constraint analysis of the provisioning database.

In one embodiment, one or more program 440 at block 610 receives a provisioning request, the provisioning request including at least processor, memory, storage, or tenant requirements of the at least one virtual machine; and one or more program 440 at block 610 compares the processor, memory, storage, or tenant requirements of the at least one virtual machine with available resources of the cloud computing environment to provision the cloud computing resources for the at least one virtual machine.

In one embodiment, the cloud computing environment includes multiple hypervisors. In such a case, one or more program 440 at block 610 selects the cloud computing resources associated with a hypervisor of the multiple hypervisors, and one or more program 440 at block 620 sends an initialization request to the selected hypervisor.

In one embodiment, one or more program 440 at block 610 calculates available cloud computing resources of the cloud computing environment; and one or more program 440 at block 610 filters the available cloud computing resources to determine the cloud computing resources for the at least one virtual machine, the filtering including using at least one of real-time data, empirical data, or prediction data of the cloud computing environment.

In one embodiment, one or more program 440 at block 620 hosts the at least one virtual machine using the provisioned cloud computing resources of the cloud computing environment.

Figure 7A:
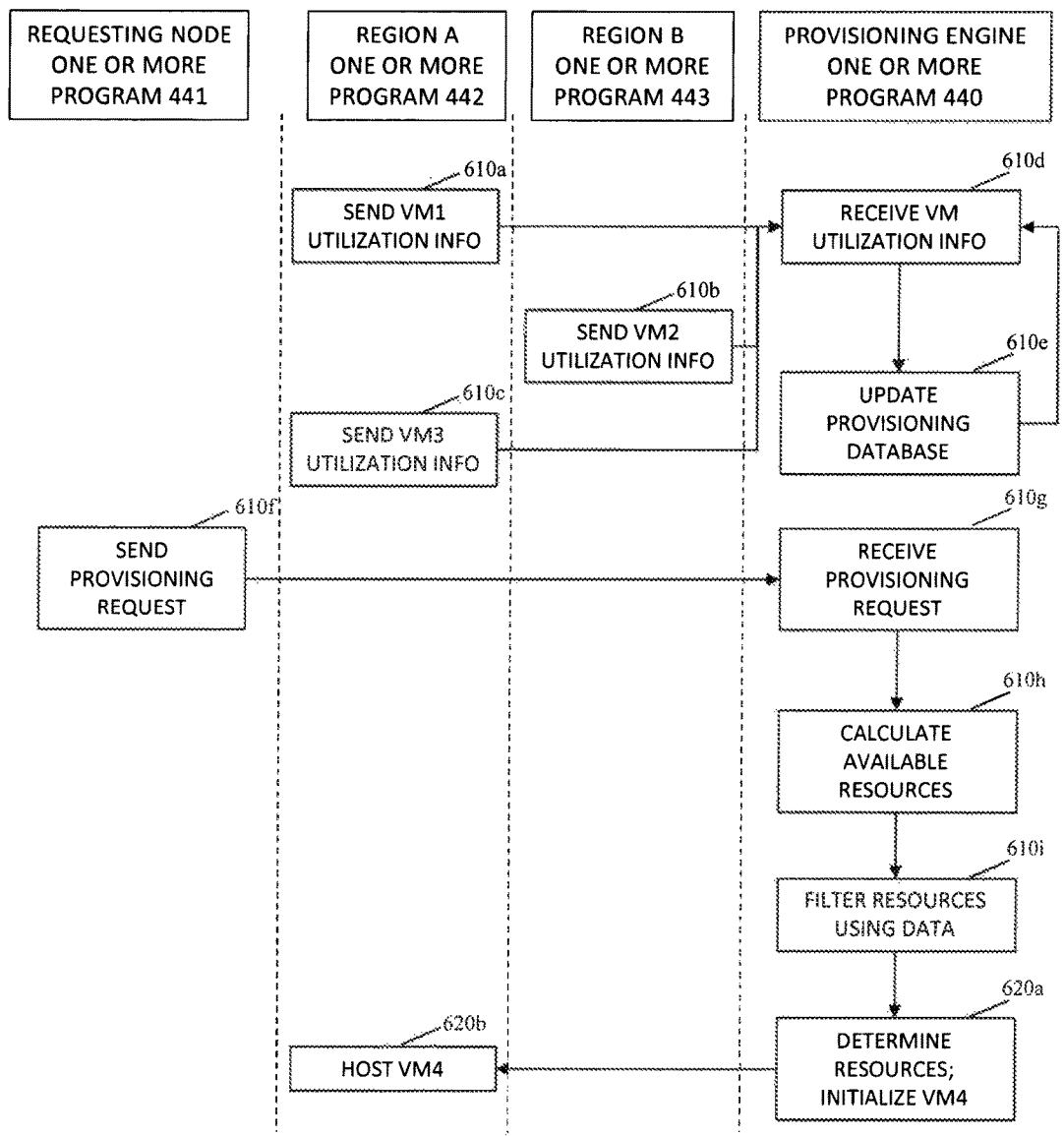
FIGS. 7A-7C are diagrams illustrating further aspects of a process for predictively provisioning cloud computing resources for a virtual machine, in accordance with one or more aspects set forth herein.
Figure 7B:
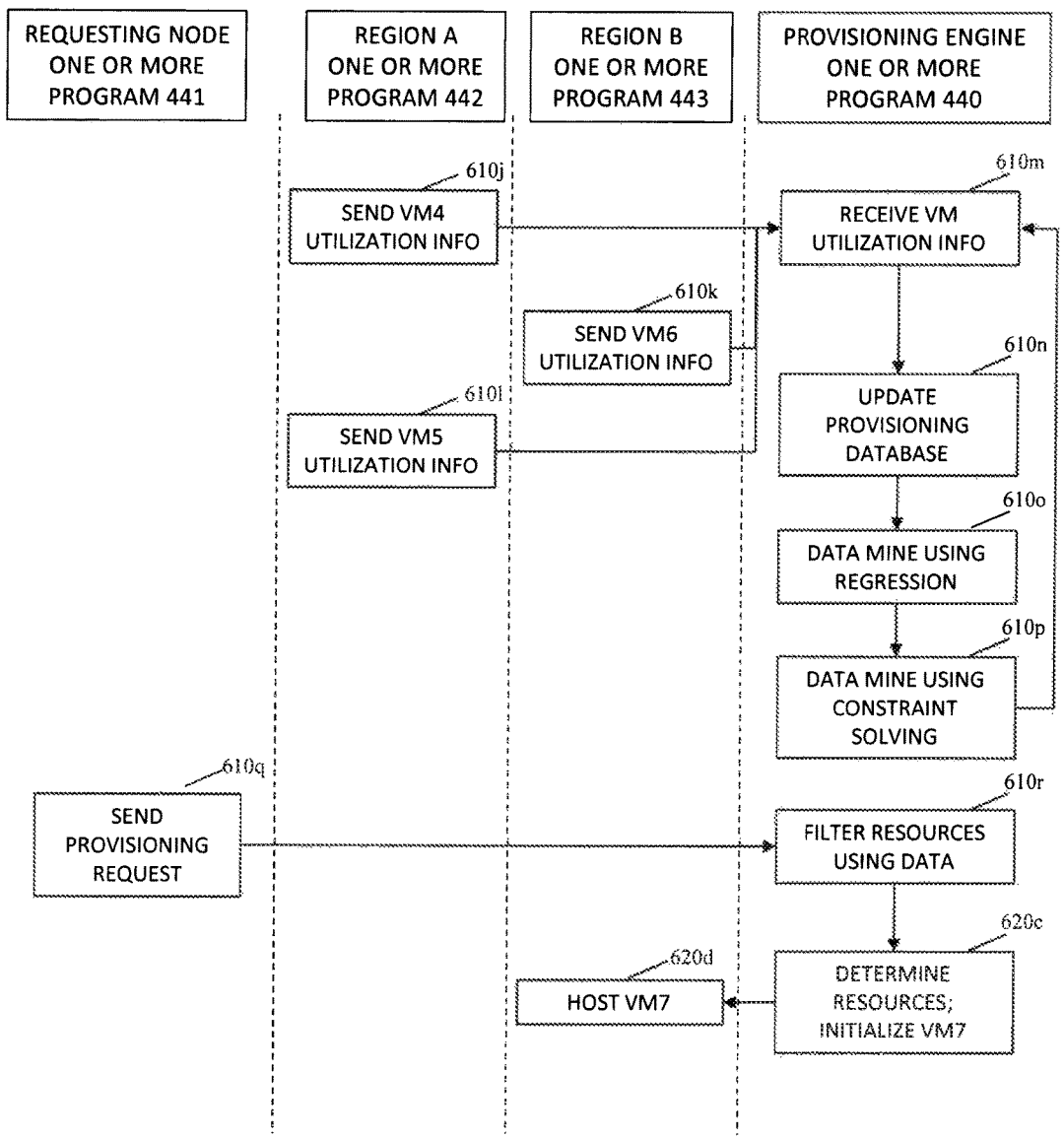
Figure 7C:
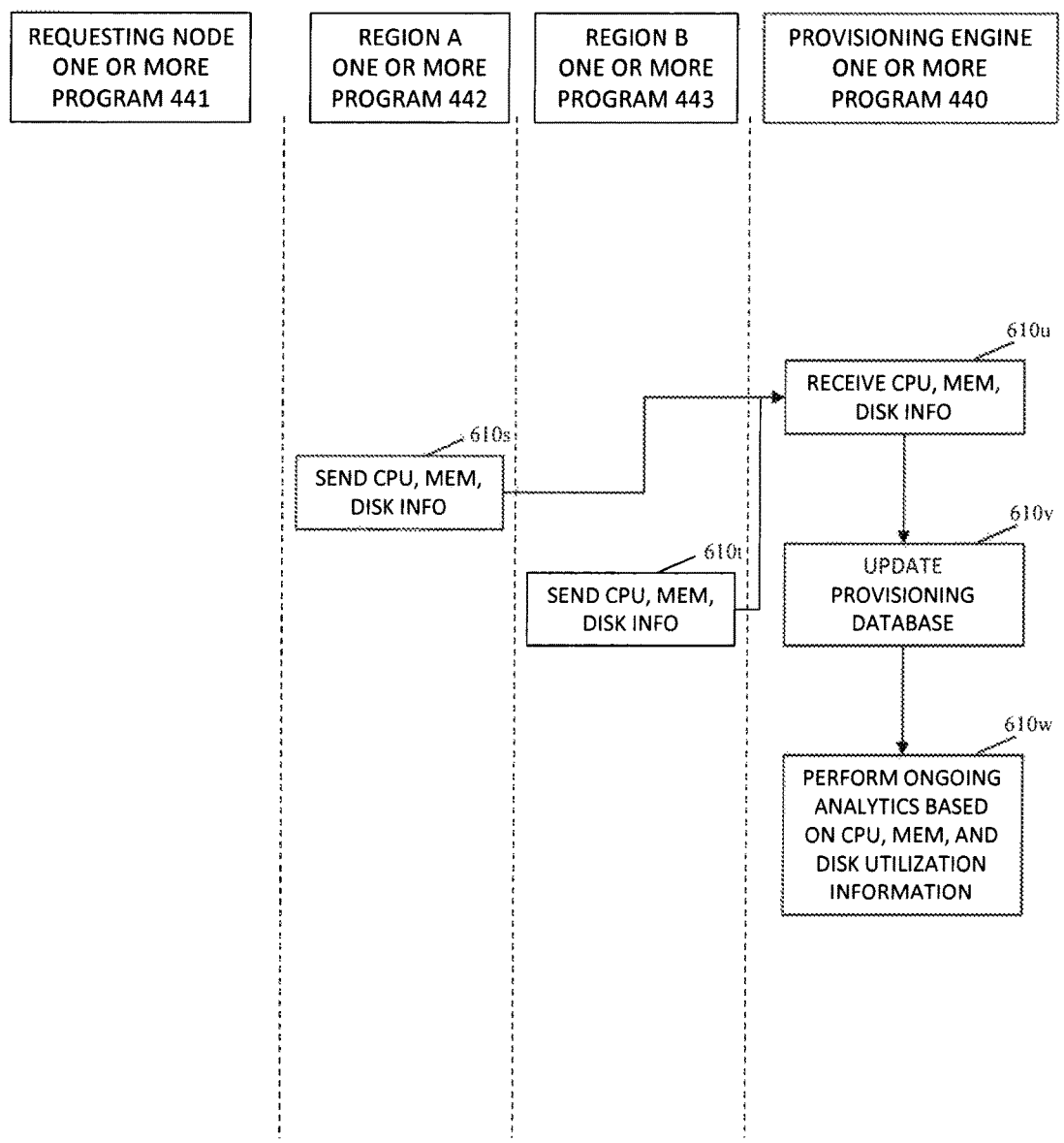

FIGS. 7A-7C are diagrams illustrating further aspects of a process for predictively provisioning cloud computing resources for a virtual machine, in accordance with one or more aspects set forth herein. By way of explanation, in FIGS. 7A-7C, processes are illustrated from the point of view of a provisioning engine one or more program 440 (e.g., running on provisioning engine 550 of FIG. 5), a requesting node one or more program 441 (e.g., running on requesting node 540 of FIG. 5), a region A one or more program 442 (e.g., running on a computing node of region A of FIG. 5), and a region B one or more program 443 (e.g., running on a computing node of region B of FIG. 5). In addition, one or more program 440 at block 610 (FIG. 6) predictively provisioning can include one or more program 440-443 performing one or more of blocks 610*a*-610*w* (FIGS. 7A-7C). Further, one or more program 440 at block 620 (FIG. 6) triggering initializing can include one or more program 440-443 performing one or more of blocks 620*a*-620*d* (FIGS. 7A-7C).

In one or more embodiments, some or all of the programs 440-443 may run on a different collection of physical or virtual machines or processors, depending on the need for scalability of the system. In one specific example, all of the programs 440-443 could run on a single multi-processor server system. In another specific example, various portions of provisioning engine one or more program 440 may run on different processors running on different computing nodes.

By way of overview, FIG. 7A illustrates, at least in part, one or more embodiments in which a provisioning request is sent from a requesting node to a provisioning engine, and the provisioning engine responds to the request by provisioning cloud computing resources of a cloud computing environment for a virtual machine. In addition, FIG. 7B illustrates, at least in part, one or more embodiments in which a provisioning engine, over the course of time, gathers information and data, such as utilization information of various virtual machines, and uses that information and data, along with various analytical techniques, described further below, to build up database(s) of information that may be used to respond to subsequent provisioning requests. In such a manner, the present techniques allow for predictive provisioning of cloud computing resources to best optimize the performance and utilization of a cloud computing environment.

With reference to FIG. 7A, in one embodiment, region A one or more program 442 at block 610*a* sends virtual machine VM1 utilization information to provisioning engine one or more program 440. In addition, in one embodiment, region B one or more program 443 at block 610*b* sends virtual machine VM2 utilization information to provisioning engine one or more program 440. Further, in one embodiment, region A one or more program 442 at block 610*c* sends virtual machine VM3 utilization information to provisioning engine one or more program 440.

In one or more embodiments, provisioning engine one or more program 440 at block 610*d* receives virtual machine utilization information related to virtual machines VM1-VM3, and at block 610*e* updates a provisioning database in accordance with the received information. For example, virtual machine VM1 may be a first type of virtual machine, such as a web server, virtual machine VM2 may be a second type of virtual machine, such as a hosted application server, and virtual machine VM3 may be a third type of virtual machine, such as a transaction processing server. In such a case, provisioning engine one or more program 440 may receive information about each of virtual machines VM1-VM3, and store such information for subsequent processing.

In operation of a system according to the present technique, information of numerous running virtual machines may be received by the provisioning engine, which may store the information within a database, and perform data analysis, including regression analysis, time series analytics, etc., to find patterns in the data which can be used to inform subsequent provisioning decisions. For example, the provisioning engine may receive information over time that indicates that certain virtual machines, for example intended to run certain server programs, may have a growth rate that requires a specific amount of RAM, disk space, CPU resources, etc. In such an example, the provisioning engine can store instructions in a database to indicate that a future provisioning request for a virtual machine running the same or similar server program should be responded to with an amount of RAM, disk, and CPU that is based on historical norms previously determined for such server programs.

Continuing with reference to FIG. 7A, in one or more embodiments, a requesting node one or more program 441 at block 610*f* sends a provisioning request to provisioning engine one or more program 440. In such a case, for example, provisioning engine one or more program 440 at block 610*g* receives the provisioning request. In one embodiment, provisioning engine one or more program 440 at block 610*h* calculates available resources, e.g., resources of a cloud computing environment. For example, the provisioning engine can determine all available resources of the cloud computing environment that are not currently allocated to other virtual machines. In one embodiment, provisioning engine one or more program 440 at block 610*i* may filter resources using data from the provisioning request. For example, the provisioning engine may use real-time data, empirical data, prediction data, or a combination thereof to provision appropriate available resources.

In one or more embodiments, provisioning engine one or more program 440 at block 620*a* may next determine the appropriate cloud computing resources for the virtual machine, responsive to the provisioning request. In such a case, the provisioning engine may make use of the historical utilization information of multiple previously operating virtual machines that was gathered by the provisioning engine, and allocate resources for virtual machine VM4. In one example, region A node one or more program 442 at block 620*b* may then launch and host virtual machine VM4.

With reference to FIG. 7B, in one embodiment, region A one or more program 442 at block 610*j* sends virtual machine VM4 utilization information to provisioning engine one or more program 440. In addition, in one embodiment, region B one or more program 443 at block 610*k* sends virtual machine VM6 utilization information to provisioning engine one or more program 440. Further, in one embodiment, region A one or more program 442 at block 610*l* sends virtual machine VM5 utilization information to provisioning engine one or more program 440.

In one or more embodiments, provisioning engine one or more program 440 at block 610*m* receives virtual machine utilization information related to virtual machines VM4-

VM6, and at block 610*n* updates a provisioning database in accordance with the received information.

In one embodiment, provisioning engine one or more program 440 at block 610*o* data mines the provisioning database to determine the cloud computing resources. For example, the provisioning engine may use regression analysis to calculate trends based on the received utilization information, and store those trends in the database for use in a subsequent provisioning request. In another embodiment, provisioning engine one or more program 440 at block 610*p* data mines the provisioning database using constraint analysis of the provisioning database. For example, a multi-dimensional constraint problem may be solved to optimally determine which cloud computing resources, such as RAM, disks, and CPU resources should be allocated together as a unit to provision a virtual machine.

In one or more embodiments, a requesting node one or more program 441 at block 610*q* sends a provisioning request to provisioning engine one or more program 440. In such a case, for example, provisioning engine one or more program 440 at block 610*r* filters the available cloud computing resources to determine the cloud computing resources to allocate for a virtual machine VM7.

In one or more embodiments, provisioning engine one or more program 440 at block 620*c* may next determine the appropriate cloud computing resources for the virtual machine, responsive to the provisioning request. In one example, region B one or more program 443 at block 620*d* may then launch and host virtual machine VM7.

With reference to FIG. 7C, in one or more embodiments, on an ongoing basis, each of regions A-B may send a variety of information to provisioning engine one or more program 440 in order to capture utilization trends to enhance provisioning of cloud computing resources for virtual machines. By way of example, region A one or more program 442 at block 610*s* (and/or region B one or more program 443 at block 610*t*) may send CPU, memory, and disk utilization information to provisioning engine one or more program 440. For instance, a table with real-time CPU, memory, and disk utilization for each hosted virtual machine may be sent to the provisioning engine on a periodic basis.

In one example, provisioning engine one or more program 440 at block 610*u* can received such a table of utilization information, and at block 610*v* update a provisioning database appropriately. For example, the provisioning database may contain CPU, memory, and disk utilization for each hosted virtual machine, correlated to a virtual machine identification (ID) number. In such a case, the provisioning database may contain a list of attributes corresponding to the virtual machine ID number, such as running operating system, application programs, number of client connections, tenant ID, and so forth.

In one or more embodiments, provisioning engine one or more program 440 at block 610*w* can perform ongoing analytics and use such information to predict the behavior of virtual machines, including the expected rate at which various resources may be allocated and released. For instance, the provisioning engine may determine that some types of virtual machines are relatively CPU intensive, but use relatively little disk resources, and other types of virtual machines have growing needs for disk utilization as time goes on. In such cases, the provisioning engine can make more optimized choices for provisioning a future virtual machine by matching its predicted resource needs with a hosting region that has current available capacity of such resources.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:
   predictively provisioning, by one or more processor, cloud computing resources of a cloud computing environment for at least one virtual machine, wherein the predictively provisioning includes receiving historical utilization information of multiple virtual machines of the cloud computing environment, the multiple virtual machines having similar characteristics to the at least one virtual machine, and determining the cloud computing resources for the at least one virtual machine using the historical utilization information of multiple virtual machines;
   triggering, by the one or more processor, initializing the at least one virtual machine with the provisioned cloud computing resources of the cloud computing environment; and
   wherein the predictively provisioning cloud computing resources of a cloud computing environment for at least one virtual machine includes predictively provisioning a certain virtual machine for miming a certain program, wherein the receiving historical utilization information of multiple virtual machines of the cloud computing environment includes receiving historical utilization information of multiple virtual machines running the certain program, wherein the determining the cloud computing resources for the at least one virtual machine includes determining provisioning resources for the certain virtual machine, wherein the triggering initializing the at least one virtual machine includes triggering initializing the certain virtual machine with the provisioning resources for the certain virtual machine, wherein the determining provisioning resources for the certain virtual machine includes determining predicted resource needs of the certain virtual machine based on a growth rate of the certain virtual machine determined using a historical growth rate of the multiple virtual machines running the certain program.

2. The method of claim 1, wherein the determining provisioning resources for the certain virtual machine includes matching the predicted resource needs to a hosting region of the cloud computing environment having current available capacity according to the predicted resource needs.

3. The method of claim 1, wherein the predictively provisioning further comprises updating a provisioning database with the historical utilization information of multiple virtual machines of the cloud computing environment.

4. The method of claim 3, wherein the determining further comprises data mining the provisioning database to determine the cloud computing resources, the data mining comprising using at least one of regression or constraint analysis of the provisioning database.

5. The method of claim 1, wherein the predictively provisioning comprises:
receiving a provisioning request, the provisioning request comprising at least processor, memory, storage, or tenant requirements of the at least one virtual machine; and
comparing the processor, memory, storage, or tenant requirements of the at least one virtual machine with available resources of the cloud computing environment to provision the cloud computing resources for the at least one virtual machine; and
wherein the predictively provisioning further comprises:
calculating available cloud computing resources of the cloud computing environment;
filtering the available cloud computing resources to determine the cloud computing resources for the at least one virtual machine, the filtering comprising using at least one of real-time data, empirical data, or prediction data of the cloud computing environment.

6. The method of claim 1, wherein the receiving historical utilization information of multiple virtual machines of the cloud computing environment includes receiving a table with a real-time CPU memory and disk utilization for each of the multiple virtual machines on a periodic basis, and wherein the receiving historical utilization information of multiple virtual machines of the cloud computing environment includes receiving historical utilization information of a first virtual machine at a first data center and receiving historical utilization information of a second virtual machine at a second data center external to the first data center, and wherein the initializing the at least one virtual machine includes initializing at least one virtual machine of the second data center.

7. The method of claim 1, wherein the predictively provisioning cloud computing resources of a cloud computing environment for at least one virtual machine includes predictively provisioning a certain virtual machine for miming a certain program, wherein the receiving historical utilization information of multiple virtual machines of the cloud computing environment includes receiving historical utilization information of multiple virtual machines running the certain program, wherein the determining the cloud computing resources for the at least one virtual machine includes determining provisioning resources for the certain virtual machine, wherein the triggering initializing the at least one virtual machine includes triggering initializing the certain virtual machine with the provisioning resources for the certain virtual machine, wherein the determining provisioning resources for the certain virtual machine includes determining predicted resource needs of the certain virtual machine based on a growth rate of the certain virtual machine determined using a historical growth rate of the multiple virtual machines miming the certain program and wherein the determining provisioning resources for the certain virtual machine includes matching the predicted resource needs to a hosting region of the cloud computing environment having current available capacity according to the predicted resource needs.

8. A computer program product comprising:
a computer readable storage medium readable by one or more processor and storing instructions for execution by the one or more processor for performing a method comprising:
predictively provisioning, by the one or more processor, cloud computing resources of a cloud computing environment for at least one virtual machine, wherein the predictively provisioning includes receiving historical utilization information of multiple virtual machines of the cloud computing environment, the multiple virtual machines having similar characteristics to the at least one virtual machine, and determining the cloud computing resources for the at least one virtual machine using the historical utilization information of multiple virtual machines;
triggering, by the one or more processor, initializing the at least one virtual machine with the provisioned cloud computing resources of the cloud computing environment; and
wherein the predictively provisioning cloud computing resources of a cloud computing environment for at least one virtual machine includes predictively provisioning a certain virtual machine for running a certain program, the certain virtual machine being of a certain type, wherein the receiving historical utilization information of multiple virtual machines of the cloud computing environment includes receiving historical utilization information of multiple virtual machines running the certain program, the certain virtual machine being of a certain type, wherein the determining the cloud computing resources for the at least one virtual machine includes determining provisioning resources for the certain virtual machine, wherein the triggering initializing the at least one virtual machine includes triggering initializing the certain virtual machine with the provisioning resources for the certain virtual machine, wherein the method includes storing into a provisioning database historical utilization information of multiple virtual machines of the certain type, wherein the provisioning database includes historical utilization information of a prior virtual machine of the certain type for running the certain program, the prior virtual machine no longer operating in the environment, wherein the determining provisioning resources for the certain virtual machine includes, prior to receiving a provisioning request to provision the certain virtual machine, determining and storing trend information, wherein determining the trend information includes using the historical utilization information of the prior virtual machine of the certain type for running the certain program, the prior virtual machine no longer operating in the environment, wherein the method includes receiving the provisioning request to provision the certain virtual machine, and wherein the method includes responding to the provisioning request to provision the certain virtual machine using the trend information determined prior to the receiving the provisioning request.

9. The computer program product of claim 8, wherein the determining provisioning resources for the certain virtual machine includes determining predicted disk utilization resource needs of the certain virtual machine based on a growth rate of the certain virtual machine determined using a historical disk utilization growth rate of the multiple virtual machines running the certain program, wherein the triggering initializing the at least one virtual machine includes transmitting a message to a hosting computing requesting that the hosting computing node perform initializing of the certain virtual machine to launch the certain virtual machine, wherein the receiving historical utilization information of multiple virtual machines of the cloud computing environment includes receiving historical utilization information of multiple virtual machines of the type of the certain virtual machine running the certain program and receiving historical utilization information of multiple virtual machines that are of types other than the certain virtual machine.

10. The computer program product of claim 8, wherein the method includes storing into a provisioning database first information including historical utilization information of multiple virtual machines of the type of the certain virtual machine miming the certain program and storing into the provisioning database second information including historical utilization information of multiple virtual machines that are of types other than a type of the certain virtual machine.

11. A system comprising:
a memory;
one or more processor in communication with the memory; and
program instructions executable by the one or more processor via the memory to perform a method, the method comprising:
predictively provisioning, by one or more processor, cloud computing resources of a cloud computing environment for at least one virtual machine, wherein the predictively provisioning includes receiving historical utilization information of multiple virtual machines of the cloud computing environment, the multiple virtual machines having similar characteristics to the at least one virtual machine, and determining the cloud computing resources for the at least one virtual machine using the historical utilization information of multiple virtual machines;
triggering, by the one or more processor, initializing the at least one virtual machine with the provisioned cloud computing resources of the cloud computing environment; and
wherein the cloud computing environment comprises multiple hypervisors, the predictively provisioning comprises selecting the cloud computing resources associated with a hypervisor of the multiple hypervisors, and the triggering initializing comprises sending an initialization request to the hypervisor associated to the selected cloud computing resources.

12. The system of claim 11, wherein each of the multiple virtual machines and the at least one virtual machine subject to the initializing run different instances of the same program.

13. The system of claim 11, wherein the receiving historical utilization information of multiple virtual machines of the cloud computing environment includes receiving a table with a real-time CPU memory and disk utilization for each of the multiple virtual machines on a periodic basis, wherein the receiving historical utilization information of multiple virtual machines of the cloud computing environment includes receiving historical utilization information of a first virtual machine at a first data center and receiving historical utilization information of a second virtual machine at a second data center external to the first data center, and wherein the initializing the at least one virtual machine includes initializing at least one virtual machine of the second data center, and wherein each of the multiple virtual machine and the at least one virtual machine subject to the initializing run different instances of the same program.

14. The system of claim 11, wherein the predictively provisioning cloud computing resources of a cloud computing environment for at least one virtual machine includes predictively provisioning a certain virtual machine for running a certain program, wherein the receiving historical utilization information of multiple virtual machines of the cloud computing environment includes receiving historical utilization information of multiple virtual machines of the type of the certain virtual machine running the certain program and receiving historical utilization information of multiple virtual machines that are of types other than the certain virtual machine, wherein the determining the cloud computing resources for the at least one virtual machine includes determining provisioning resources for the certain virtual machine, wherein the triggering initializing the at least one virtual machine includes triggering initializing the certain virtual machine with the provisioning resources for the certain virtual machine, wherein the method includes storing into a provisioning database first information including historical utilization information of multiple virtual machines of the type of the certain virtual machine running the certain program and storing into the provisioning database second information including historical utilization information of multiple virtual machines that are of types other than a type of the certain virtual machine, wherein the determining provisioning resources for the certain virtual machine include using the first information of the provisioning database preferentially to using the second information of the provisioning database.

15. The system of claim 11, wherein the predictively provisioning cloud computing resources of a cloud computing environment for at least one virtual machine includes predictively provisioning a certain virtual machine for running a certain program, wherein the receiving historical utilization information of multiple virtual machines of the cloud computing environment includes receiving historical utilization information of multiple virtual machines of the type of the certain virtual machine running the certain program and receiving historical utilization information of multiple virtual machines that are of types other than the certain virtual machine, wherein the determining the cloud computing resources for the at least one virtual machine includes determining provisioning resources for the certain virtual machine, wherein the triggering initializing the at least one virtual machine includes triggering initializing the certain virtual machine with the provisioning resources for the certain virtual machine, wherein the method includes storing into a provisioning database first information including historical utilization information of multiple virtual machines of the type of the certain virtual machine running the certain program and storing into the provisioning database second information including historical utilization information of multiple virtual machines that are of types other than a type of the certain virtual machine, wherein the determining provisioning resources for the certain virtual machine includes, prior to receiving a provisioning request to provision the certain virtual machine, determining and storing trend information based on the first information for use in provisioning the certain virtual machine, wherein the method includes receiving the provisioning request to provision the certain virtual machine, and wherein the method includes responding to the provisioning request to provision the certain virtual machine using the trend information determined prior to the receiving the provisioning request.

16. The system of claim 11, wherein the predictively provisioning cloud computing resources of a cloud computing environment for at least one virtual machine includes predictively provisioning a certain virtual machine for running a certain program, wherein the receiving historical utilization information of multiple virtual machines of the cloud computing environment includes receiving historical utilization information of multiple virtual machines of the type of the certain virtual machine running the certain program and receiving historical utilization information of multiple virtual machines that are of types other than the certain virtual machine, wherein the determining the cloud computing resources for the at least one virtual machine includes determining provisioning resources for the certain virtual machine, wherein the triggering initializing the at least one virtual machine includes triggering initializing the certain virtual machine with the provisioning resources for the certain virtual machine, wherein the method includes storing into a provisioning database first information including historical utilization information of multiple virtual machines of the type of the certain virtual machine running the certain program and storing into the provisioning database second information including historical utilization information of multiple virtual machines that are of types other than a type of the certain virtual machine, wherein the provisioning database includes historical utilization information of a virtual machine of the certain type running the certain program that is no longer operating in the environment, wherein the determining provisioning resources for the certain virtual machine includes, prior to receiving a provisioning request to provision the certain virtual machine, determining and storing trend information based on the first information for use in provisioning the certain virtual machine, wherein determining the trend information based on the first information includes using the historical utilization information of the virtual machine of the certain type running the certain program that is no longer operating in the environment, wherein the method includes receiving the provisioning request to provision the certain virtual machine, and wherein the method includes responding to the provisioning request to provision the certain virtual machine using the trend information determined prior to the receiving the provisioning request.

17. The system of claim 11, wherein the predictively provisioning cloud computing resources of a cloud computing environment for at least one virtual machine includes predictively provisioning a certain virtual machine for running a certain program, wherein the receiving historical utilization information of multiple virtual machines of the cloud computing environment includes receiving historical utilization information of multiple virtual machines running the certain program, wherein the determining the cloud computing resources for the at least one virtual machine includes determining provisioning resources for the certain virtual machine, and wherein the triggering initializing the at least one virtual machine includes triggering initializing the certain virtual machine with the provisioning resources for the certain virtual machine.

18. The system of claim 11, wherein the predictively provisioning cloud computing resources of a cloud computing environment for at least one virtual machine includes predictively provisioning a certain virtual machine for running a certain program, wherein the receiving historical utilization information of multiple virtual machines of the cloud computing environment includes receiving historical utilization information of multiple virtual machines running the certain program, wherein the determining the cloud computing resources for the at least one virtual machine includes determining provisioning resources for the certain virtual machine, wherein the triggering initializing the at least one virtual machine includes triggering initializing the certain virtual machine with the provisioning resources for the certain virtual machine, wherein the determining provisioning resources for the certain virtual machine includes determining predicted disk utilization resource needs of the certain virtual machine based on a growth rate of the certain virtual machine determined using a historical disk utilization growth rate of the multiple virtual machines running the certain program.

19. The system of claim 11, wherein the predictively provisioning cloud computing resources of a cloud computing environment for at least one virtual machine includes predictively provisioning a certain virtual machine for running a certain program, wherein the receiving historical utilization information of multiple virtual machines of the cloud computing environment includes receiving historical utilization information of multiple virtual machines running the certain program, wherein the determining the cloud computing resources for the at least one virtual machine includes determining provisioning resources for the certain virtual machine, wherein the triggering initializing the at least one virtual machine includes triggering initializing the certain virtual machine with the provisioning resources for the certain virtual machine, and wherein the triggering initializing the at least one virtual machine includes transmitting a message to a hosting computing requesting that the hosting computing node perform initializing of the certain virtual machine to launch the certain virtual machine.

20. The system of claim 11, wherein the predictively provisioning cloud computing resources of a cloud computing environment for at least one virtual machine includes predictively provisioning a certain virtual machine for miming a certain program, wherein the receiving historical utilization information of multiple virtual machines of the cloud computing environment includes receiving historical utilization information of multiple virtual machines running the certain program, wherein the determining the cloud computing resources for the at least one virtual machine includes determining provisioning resources for the certain virtual machine, wherein the triggering initializing the at least one virtual machine includes triggering initializing the certain virtual machine with the provisioning resources for the certain virtual machine, wherein the determining provisioning resources for the certain virtual machine includes determining predicted disk utilization resource needs of the certain virtual machine based on a growth rate of the certain virtual machine determined using a historical disk utilization growth rate of the multiple virtual machines running the certain program, wherein the triggering initializing the at least one virtual machine includes transmitting a message to a hosting computing requesting that the hosting computing node perform initializing of the certain virtual machine to launch the certain virtual machine, wherein the receiving historical utilization information of multiple virtual machines of the cloud computing environment includes receiving historical utilization information of multiple virtual machines of the type of the certain virtual machine running the certain program and receiving historical utilization information of multiple virtual machines that are of types other than the certain virtual machine, wherein the method includes storing into a provisioning database first information including historical utilization information of multiple virtual machines of the type of the certain virtual machine running the certain program and storing into the provisioning database second information including historical utilization information of multiple virtual machines that are of types other than a type of the certain virtual machine, wherein the provisioning database includes historical utilization information of a virtual machine of the certain type and running the certain program that is no longer operating in the environment, wherein the determining provisioning resources for the certain virtual machine includes, prior to receiving a provisioning request to provision the certain virtual machine, determining and storing trend information based on the first information for use in provisioning the certain virtual machine, wherein determining the trend information based on the first information includes using the historical utilization information of the virtual machine of the certain type running the certain program that is no longer operating in the environment, wherein the method includes receiving the provisioning request to provision the certain virtual machine, and wherein the method includes responding to the provisioning request to provision the certain virtual machine using the trend information determined prior to the receiving the provisioning request.

* * * * *